United States Patent
Craymer et al.

(10) Patent No.: US 11,514,153 B2
(45) Date of Patent: Nov. 29, 2022

(54) METHOD OF REGISTERING AND AUTHENTICATING A USER OF AN ONLINE SYSTEM

(71) Applicant: Shayype Global Limited, Huntingdon (GB)

(72) Inventors: Jonathan Geoffrey Milton Craymer, Huntingdon (GB); Jon Andrew Beal, Huntingdon (GB)

(73) Assignee: Shayype Global Limited, Huntingdon (GB)

( * ) Notice: Subject to any disclaimer, the term of this patent is extended or adjusted under 35 U.S.C. 154(b) by 198 days.

(21) Appl. No.: 16/629,991

(22) PCT Filed: Jul. 10, 2018

(86) PCT No.: PCT/GB2018/051955
§ 371 (c)(1),
(2) Date: Jan. 10, 2020

(87) PCT Pub. No.: WO2019/012268
PCT Pub. Date: Jan. 17, 2019

(65) Prior Publication Data
US 2020/0134167 A1    Apr. 30, 2020

(30) Foreign Application Priority Data
Jul. 10, 2017 (GB) ..................... 1711077

(51) Int. Cl.
*G06F 21/45* (2013.01)
*G06F 21/31* (2013.01)

(52) U.S. Cl.
CPC .............. *G06F 21/45* (2013.01); *G06F 21/31* (2013.01); *G06F 2221/2117* (2013.01)

(58) Field of Classification Search
CPC ................................ G06F 21/31; G06F 21/45
See application file for complete search history.

(56) References Cited

U.S. PATENT DOCUMENTS

| | | | |
|---|---|---|---|
| 6,246,769 B1 | 6/2001 | Kohut | |
| 10,536,436 B1 * | 1/2020 | Barbour | H04L 63/0838 |
| 2003/0221131 A1 | 11/2003 | Mori et al. | |
| 2015/0244522 A1 | 8/2015 | Cheruvath et al. | |
| 2015/0341327 A1 | 11/2015 | Barton et al. | |
| 2018/0241747 A1 | 8/2018 | Tanaka et al. | |
| 2019/0123847 A1 * | 4/2019 | Bush | H04L 63/12 |

FOREIGN PATENT DOCUMENTS

| | | | | |
|---|---|---|---|---|
| EP | 1475721 A1 | 11/2004 | | |
| WO | 2017033442 A1 | 3/2017 | | |
| WO | WO-2017033442 A1 * | 3/2017 | ............. | G06F 21/31 |
| WO | WO-2019038252 A1 * | 2/2019 | ............... | H04L 9/38 |

OTHER PUBLICATIONS

UKIPO, Combined Search and Examination Report for corresponding GB Patent Application No. 1711077.6, dated Jul. 30, 2018, 6 pages.
ISA/EP, International Search Report and Written Opinion for corresponding PCT Patent Application No. PCT/GB2018/051955, dated Sep. 11, 2018, 13 pages.
Adi Shamir: "How to Share a Secret", Communications of the ACM, Nov. 1979, vol. 22, No. 11, pp. 612-613.
Ali Bagherzandi et al.: "Password-Protected Secret Sharing", Computer and Communications Security, ACM, Oct. 17, 2011, pp. 433-443.
UKIPO, Examination Report for corresponding GB Patent Application No. 1711077.6, dated Sep. 23, 2020, 3 pages.

* cited by examiner

*Primary Examiner* — Tongoc Tran
(74) *Attorney, Agent, or Firm* — NK Patent Law

(57) ABSTRACT

The present invention provides a method of registering a new user of an online system is disclosed. A base grid is created. The user provides a passcode that includes an indication of an ordered set of cells a grid. A grid salt, user identifying information, and a passcode identifier is generated. The passcode identifier is then split into at least three parts using a secret sharing algorithm wherein three of the parts are required to regenerate the passcode identifier. First and second parts are stored in first and second locations in an array and a third part is stored in a third location with user identifying information. The first and second parts are indexed using X-OTC and Y-OTC. A user token containing the position of the first and second parts in the array is passed to the user.

7 Claims, No Drawings

METHOD OF REGISTERING AND AUTHENTICATING A USER OF AN ONLINE SYSTEM

CROSS-REFERENCE TO RELATED APPLICATIONS

This application is a U.S. National Stage application of International Patent Application No. PCT/GB2018/051955, filed on Jul. 10, 2018, which claims priority to United Kingdom Patent Application No. 1711077.6, filed on Jul. 10, 2017, the entire content of all of which is incorporated by reference herein.

FIELD OF INVENTION

The method of the present invention relates to the use of passwords and passcodes to register and authenticate users of an online service and in other applications. In particular the present invention provides an improved method of registering and authenticating users using passwords or passcodes and may be substantially more secure than prior art methods. This is achieved by the use of secret sharing algorithms.

BACKGROUND

In many situations it is desirable to authenticate the identity of a user or a group of users of an online service. This is typically done using a passcode such as a password. A passcode can be a one-time passcode or may be a set passcode for the user. Regardless of whether the passcode is one-time or set it is necessary for the passcode and associated user identifying information to be stored by the online service after initial registration such that the user can be authenticated when they try to log back into the service. Safely storing user passcodes and associated user information is a problem as such information is frequently the target of malicious attacks.

User passcodes and associated user information is always stored in one or more secure locations. However, such locations can never be totally secure particularly in an age of government mandated backdoors. Therefore, in most cases further security measures are used to protect stored user passcodes and associated user information. This can be done by splitting the passcodes and associated user information and storing them in separate locations. In addition or as an alternative the passcodes and associated user information can be encrypted before storage. One-way encryption is often used to prevent hackers obtaining passcodes even if they manage to obtain the encrypted data.

Despite the above, increasingly sophisticated hackers can often manage to retrieve useful information from encrypted data. As a result, conventional encryption is becoming insufficient to adequately store user passcodes and associated user information, particularly if the encrypted data is stored in a single location. Even if the data is split across more than one location useful information can often be extracted simply by accessing information from a single one of those locations.

In light of the above, there is a need for a secure way of storing sensitive data online that does not simply rely on conventional encryption techniques. Preferably any such method should be useful for storing user passcodes and associated user information and associated methods of registering and authenticating users.

GB2532204 discloses a method and system of registering and authenticating a user of an online system. The method and system of GB2532204 uses pattern authentication technology. In particular, a user generates a passcode by selecting a number of positions from a grid that is presented to them. Preferably any new method of storing user passcodes and associated user information should be compatible with such technology.

SUMMARY OF INVENTION

The present invention provides a method of registering a new user of an online system comprising the steps of:
creating a base grid for the user, the base grid comprising a re-creatable pseudo-randomized grid that is unique to the user;
receiving and confirming an input from a user comprising a passcode, wherein the passcode comprises an indication of an ordered set of cells in a generated grid, said generated grid comprising a plurality of cells each containing a character;
generating a passcode identifier from the passcode;
generating a grid salt for the user;
generating user identifying information for the user;
splitting the passcode identifier into k parts using a secret sharing algorithm wherein:
q of the k parts are required to regenerate the passcode and k≥q;
3=q;
a first part is assigned to be an X-SID and is stored in a first location in an array;
a second part is assigned to be a Y-SID and is stored in a second location in the array;
a third part is assigned to be a Z-SID and is stored in a third location; and
p of the k parts are discarded and p≥0; and wherein
a X-OTC and a Y-OTC are read from the base grid using the user's passcode;
the X-OTC is used as an index for the first part in the array and the position of the first part in the array is returned as x-delta;
the Y-OTC is used as an index for the second part in the array; and
the position of the second part in the array is returned as y-delta;
the third part is stored with the user identifying information;
a user token comprising a version, a creation date, an expiry date, the grid salt, x-delta, y-delta, and Z-SID is generated; and
the user token is encrypted and passed back to the user for storage.

In the meaning of the present invention a passcode identifier (PI) is a unique identifier relating to the passcode. A passcode may be any suitable code that a user can maintain as their own secret and they can input when provided with a suitable input mechanism. The passcode comprises an indication of an ordered set of cells in a generated grid.

The method of the present invention is advantageous over the prior art in that it utilises a secret sharing algorithm to split a passcode identifier (PI) into k separate parts, which can then be recombined to regenerate the PI. A first part is assigned to be an X-SID and is stored in a first location in an array. A second part is assigned to be a Y-SID and is stored in a second location in the array. A third part is assigned to be a Z-SID and is stored in a third location. p of the k parts are discarded and p≥0. In order to regenerate the PI it is necessary to have at least 3 of the k separate parts. q>n so a person only obtaining access to the first location and obtaining 1 of the parts cannot regenerate the PI. Similarly, a person only obtaining access to the second location and obtaining 1 of the parts cannot regenerate the PI. Rather, it is necessary to access more than one location in order to obtain 3 parts and thereby be able to regenerate the PI.

It is to be understood that secret sharing algorithms are well known and a skilled person would be readily able to apply a secret sharing algorithm to split a PI into k parts in accordance with the present invention.

In embodiments of the invention p=0 and none of the k parts of the PI are discarded. In other embodiments of the invention p≥1 and one or more of the k parts of the PI are discarded. Conventionally, if a PI is separated into separate parts by an algorithm all of those parts are required to be combined in order to regenerate the PI. So by discarding one or more of the k parts the security of the method of the present invention is increased e.g. as it would be difficult to reverse engineer the location of records in a database.

The first location and the second location may be separate locations within a database or array. Alternatively, the first location and the second location may be remote from one another e.g. the first location may be a first database and the second location may be a second database. In such embodiments the first database and the second database may be stored at the same or at different physical locations. For example, the first database may be stored on a first server and the second database may be stored on a second server. For example, the first or second database may be stored on a client server whilst the other of the first or second database may be stored on an authentication server.

In embodiments of the invention (n+m)≥q. That is, in such embodiments it is possible to regenerate the PI if a person has access to the n parts at the first location and the m parts at the second location without it being necessary to obtain any further parts from any other location. In some such embodiments n+m+p=k. That is, the PI is split into k parts that are each either stored at the first location, stored at the second location, or discarded and in order to regenerate the PI it is necessary to obtain the n parts from the first location and the m parts from the second location. In other such embodiments n+m+p<k and at least some of the k parts are stored at some other location. Nevertheless, in such embodiments it will still be possible to regenerate the PI from the n parts at the first location and the m parts at the second location.

In alternative embodiments of the invention to those of the paragraph immediately above (n+m)<q and in order to regenerate the PI it is essential to access at least some of the k parts of the PI that are stored in an alternative location. That is, in such alternative embodiments it is not possible to regenerate the PI solely from the n parts at the first location and the m parts at the second location.

In embodiments of the invention r of the k parts are stored in a third location and q>r≥1;
  (n+m)<q;
  (n+r)<q;
  (m+r)<q; and
  (n+m+r)≥q.

In such embodiments it is not possible to regenerate the PI solely by accessing two of the first, second, and third locations. Rather, it is possible to regenerate the PI by accessing the first, second, and third locations and obtaining the n, m, and r parts.

In alternative embodiments r of the k parts are stored in a third location, q>r≥1; and
  at least one of (n+m), (n+r), and (m+r) is ≥q.

In such embodiments it is possible to regenerate the PI solely by accessing two of the first, second, and third locations. In particular, it is possible to regenerate the PI by accessing the two of the first second and third locations that together contain sufficient of the k parts of the PI to regenerate the PI. In some such embodiments at least two of (n+m), (n+r), and (m+r) are ≥q. In some such embodiments all of (n+m) or (n+r), or (m+r) are ≥q and the PI can be regenerated by accessing the parts stored at any two of the three locations.

In embodiments of the present invention r of the k parts may be stored in a third location r>n≥1; and s of the k parts are stored in a fourth location and s>n≥1. That is, in such embodiments parts of the PI may be stored in at least four locations.

In much the same manner as in embodiments in which the parts of the PI are stored in three locations, in embodiments of the invention in which the PI is stored in four locations it may be necessary to access four, three, or only two of the four locations in order to regenerate the PI. For example, it may be necessary to access a select three, or any three of the four locations in order to obtain q parts of the PI. Similarly, it may be necessary to access only two of the four locations in order to obtain q parts of the PI.

In principle and as will be readily understood by the person skilled in the art, there is no limit to the number of different locations in which parts of a PI may be stored in a method according to the present invention. However, in order to prevent regeneration of the PI and operation of the method generally becoming too complex, it is anticipated that the parts of a PI will generally be stored in four or fewer locations.

The method of the present invention may operate with substantially any online service that utilises passwords and/or passcodes to allow users to securely access the system. However, it may be preferable that the method of the present invention is used with pattern authentication technology, for example methods in which a user generates a passcode by selecting an ordered set of positions from a grid that is presented to them. In embodiments of the present invention the input from the user will comprise an indication of an ordered set of cells in a grid, said grid comprising a plurality of cells, each cell containing a character. For example, a grid presented to a user in such a method may comprise a number of cells each containing a pseudo-randomly generated number, letter, or character. In such embodiments the input from the user may comprise the ordered set of the numbers, letters, or other characters that are present in each cell of the pattern that they have selected.

The method may further comprise the step of allowing the user to select the shape of the grid and the number of cells in the grid before the user selects a number of positions from said grid. For example, during the process of registering for the online system a user may either define the shape and size of the grid themselves or they may select one of a number of pre-defined acceptable grids, each having a different size and/or shape. In order to provide satisfactory levels of security it may be preferable that any grid presented to, or selected by, a user comprises at least 36 cells, for example a grid may comprise at least 6×6 cells.

In methods according to the present invention a base grid may be generated for each user, wherein the base grid comprises a re-creatable pseudo-randomised grid that is unique to a user. A base grid may be generated using variables including but not limited to the size of grid presented to, or selected by, a user, a client identification number and a grid salt. A base grid can then be used to index at least the n of the k parts and the m of the k parts before they are stored at the first location and the second location. For example, a X-OTC and a Y-OTC may be read from a user's base grid using the user's PI. The X-OTC may then be used as an index to store the n of k parts in an array, the Y-OTC may be used as an index to store the m of k parts in the array; and the position in the array(s) are returned as x-delta and y-delta. The n of k parts and the m of k parts may be stored in the same array or in a different array.

In methods of the present invention, it is necessary to know the first location and the second location in the array in order for the PI to be subsequently regenerated using a secret sharing algorithm. In particular, in order to regenerate the PI it is necessary for the first part and the second part to be located. In order to be able to locate the first location and the second location a user token comprising data relating to the user including information identifying the first location and the second location may be generated and encrypted and then stored by the user.

The present invention also provides a method of authenticating a user of an online system that has registered using method of registering a new user of an online system of the present invention, the method comprising the steps of:

generating a challenge code for the user;
generating a generated grid for the user having a pseudo-random character at each cell generated from the challenge code;
receiving an input from the user comprising an indication of their passcode, being an ordered set of cells in the generated grid, a credential, and their user token;
obtaining x-delta, y-delta, Z-SID and the grid salt for the user from the decrypted user token;
regenerating the generated grid presented to the user from the grid salt; and
identifying all the possible passcodes in the generated grid from the indication of the passcode received from the user;
i) retrieving an X-SID and a Y-SID of a passcode identifier from the array for the one of the possible passcodes using the x-delta and y-delta;
ii) regenerating a passcode identifier associated with the user from the X-SID, Y-SID, and Z-SID using the secret sharing algorithm; and
iii) authenticating the user if the regenerated PI matches the PI stored for the user;
iv) repeating steps (i) to (iii) for a subsequent one of the possible passcodes if the regenerated passcode identifier does not match the passcode identifier generated from the input;
v) denying authentication of the user if the regenerated passcode identifier does not match the passcode identifier generated from the input for any of the possible passcodes.

Parts of the PI are stored in a first location and a second location in an array and it is necessary to access those two locations to obtain the first part and the second parts and thereby be able to regenerate the PI. The first location and the second location are located in the same array.

The input received from the user may correspond to an ordered set of cells from a grid, each cell containing a character. That is, the method of authenticating a user may be used with a pattern authenticating method wherein when authenticating a user the user will be presented with, or asked to select, a grid the same size and shape as that used when they registered with the online system and then asked to provide an input that corresponds to an ordered set of cells in that grid. The user may simply input the characters that are present in the relevant ordered set of cells. Alternatively, in order to provide greater security, the input from the user may comprise a plurality of user gestures indicating the ordered set of cells. For example, in addition to a pattern the user may have a personal identification code and the user may swipe each of the ordered set of cells in the grid in turn to change the character in said cells until they match a digit or character of their personal identification code, the swipes being monitored to determine the user's passcode.

The methods of the present invention can be utilised for individual users or for groups of users. The above description primarily relates to individual users but the same methods could be used for authenticating groups of users in the following manner.

Group authentication would require a group master who would authenticate themselves in the normal manner as for an individual user in the manner described above. Thereafter group members would only require authentication against the group members and their group master i.e. parts of each group member are combined to obtain the PI for the group. There are three particular possibilities for implementing this:

i) anonymous-user group authentication

This is where each user authenticates themselves using a group name as their identity and a group passcode as their credential. The system will not know the identity of the particular user but will give said user restricted privileges allowed to all members of the group.

ii) implicit-user group authentication

This is where each user authenticates themselves using the group name as their identity and a user specific passcode as their identity. The system will then be able to derive the identity of the user from their user specific passcode and provide appropriate privileges.

iii) explicit-user group authentication

This is where each user authenticates themselves using an individual user name but uses the group passcode as their credential. The system will then know who the user is but will give restricted privileges allowed to all members of the group.

Two specific embodiments of the invention will now be described. Both embodiments use pattern authentication. It is to be understood that, unless otherwise indicated by context, each feature of each of the embodiments may be incorporated into any embodiment of the invention.

FIRST EMBODIMENT

A first exemplary embodiment of the method of the present invention will now be described. This embodiment is presented as an example only and is not intended to be limiting on the scope of the application. The method is operated on an online system.

The first embodiment utilises a passcode that is an ordered set of six cell locations in a 6×6 grid. That is, when entering their passcode, a user is presented with a 6×6 grid with each cell of the grid containing a number.

From a user perspective, when registering for the system the user provides an input that gives their ordered set of six cells and information related to that ordered set of six cells, i.e. the PI, is securely stored by the system.

From a user perspective, when a user wishes to access the system they input the numbers in each cell of the grid with which they are presented that correspond to the ordered set of six cells that is their passcode.

The online system that implements the method of the present invention comprises a number of sub-systems. These systems include an authentication engine and a data array. Secure communication between the sub-systems of the system are enforced using Transport Layer Security (TLS). Authorisation to control access to the sub-systems is managed using Oauth 2.0. In order to operate the system it is necessary for clients to be granted a licence in order to acquire an access token that grants access to the system. The following description is focussed on the method of the present invention and does not include details of the system's management of the access token.

Registering a New User

When registering a new user the system presents the user with the 6×6 grid and the user provides an input corresponding to their passcode being an ordered selection of 6 of the 36 cells. This passcode is sent to an authentication engine as a string of cell ID's representing each chosen cell in the specified order. At the same time, the system sends a code corresponding to the grid type and size to the authentication engine.

Upon receipt of this information the authentication engine assigns a unique reference number i.e. the PI, to the user's passcode. A grid salt is also be generated for the user by the authentication engine. The grid salt is an 8 character pseudo-random string of ASCII printable characters that is unique to the user.

The PI is then split into five codes using a secret sharing algorithm. Each of the five codes is a 40 character string representing a decimal number. The secret sharing algorithm is such that it is only necessary to have three of the codes to regenerate the original PI using the secret sharing algorithm. Two of the five codes are randomly selected and discarded. The three remaining codes are arbitrarily assigned to be an X-SID, Y-SID, and Z-SID.

A client ID (CID) is provided for each client from the access token granted to that client. An individual client may allow many users to access the system as determined by the licence they have purchased.

For each user, the system creates a base grid. The base grid is a grid of cells that is encrypted using the CID, the grid size and the grid salt for that user. The base grid is a re-creatable pseudo-randomised grid that is unique to the user. In the present example, the grid size for every user is 6×6 i.e. 36 cells.

An X-OTC (abscissa one-time code) and a Y-OTC (ordinate one time code) are read from the generated base grid using the user's passcode. The X-OTC being the one time code on an X-base of the base grid consisting of the values found at the positions of the user's passcode. The Y-OTC being the one time code of a Y-base of the base grid consisting of the values found at the positions of the user's passcode. The X-OTC and Y-OTC are used as indices to store the X-SID and Y-SID in an array in a database. In particular, the X-SID and Y-SID are stored in an array at the locations X-OTC and Y-OTC, and the position in each array are returned as x-delta and y-delta.

A user token comprising the following data is then generated:
version—the version of the system used to generate the user token
creation date—a unix timestamp when the user token was generated
expiry date—a unix timestamp when the user token will expire
grid salt
grid size
PI
x-delta
y-delta
Z-SID The user token is then base64 encoded and encrypted using asymmetric encryption and private key known only to the authentication engine. Finally, the user token is passed back to the user to be stored with the user data, for example on a client system.

Authenticating a User

When a user wishes to log in, they access the system online. The system then generates a challenge code, which is a unique encrypted string created by the authentication engine. The system then generates a grid which it presents to the user. The grid having a pseudo-random number at each location generated from the challenge code.

The user will then enter their credentials consisting of either their username or email address and a one-time code being the string of numbers located at the positions within the grid corresponding to their passcode. This information is then sent to the authentication engine accompanied by the user token for the specific user. The user token is then decrypted by the authentication engine to obtain the:
PI;
x-delta;
y-delta;
Z-SID; and
grid salt.

The challenge code is then used by the authentication engine to regenerate the grid presented to the user. From the regenerated grid and the one-time code entered all possible passcodes can be tested in sequence using the following mechanism.

The base grid is generated from the client ID and grid salt. The X-OTC and the Y-OTC are then obtained for a possible passcode. An X-SID and Y-SID are fetched from the array in the database using the X-OTC/x-delta and Y-OTC/y-delta as keys. The X-SID and Y-SID are then combined with the Z-SID from the user token using the secret sharing algorithm to calculate a PI. If the calculated PI matches the PI in the user token then the passcode is correct. If a correct passcode is found then the user is authenticated.

SECOND EMBODIMENT

A second exemplary embodiment of the method of the present invention will now be described. This embodiment is presented as an example only and is not intended to be limiting on the scope of the application. The method is operated on an online system.

The second exemplary embodiment is a high security embodiment relative to the first embodiment. The higher security being achieved by increasing the entropy of the password that is used. This is achieved in three ways.
  i) when registering the user will select which of a number of different grid layouts they would like to utilise.
  ii) the ratio of cells-to-numbers is increased compared to the 6×6 grid used in the first embodiment. That is, larger grids are generally used.
  iii) the use an additional fixed password (PIN) that is utilised by aligning the nth digit of the PIN over a user's memorised pattern; this is achieved by swiping left or right to increment or decrement the numbers in the cells until the nth digit of the PIN is in the desired cell.

As set out above in the summary of invention section, each of these three ways of increasing the entropy of the password can be used either in isolation or in combination with one or both of the other three ways.

From a user perspective, when registering for the system the user selects a grid layout that they would like to use, provides a PIN or chooses a cell position in an additional position on the grid, and provides an input that gives their ordered set of six cells and this information is securely stored by the system.

From a user perspective, when a user wishes to access the system they are presented with a grid having the default layout that they have selected. The user is then asked to think of the nth number of their PIN, (or chooses a cell position in an additional row on the grid) wherein n is a randomly selected number. The user will then enter their one-time code read from the grid in the following manner. The first cell of the user's ordered set of six cells is swiped left or right until said cell shows the nth number of the user's PIN. When the cell shows the nth number of the user's PIN the user will tap on the screen to indicate that the content of the cell is correct. This process is then repeated for the second and the remainder of the six cells. The system then checks this input against the user's stored passcode and if the input is correct the user is allowed to access the system.

The system that implements the method of the present invention comprises a number of sub-systems. These systems include an authentication engine and a data array. Secure communications between the sub-systems of the system are enforced using Transport Layer Security (TLS). Authorisation to control access to the sub-systems is managed using Oauth 2.0. In order to operate the system it is necessary for clients to purchase or be granted a licence in order to acquire an access token that grants access to the system. The following description is focussed on the method of the present invention and does not include details of the system's management of the access token.

Registering a New User

When registering a new user the system presents to the user a selection of different grid sizes and/or shapes and the user selects their preferred grid. This selection is sent to the authentication engine as a number representing the grid type selected. The user also provides a PIN and that is sent to the authentication engine. The user also provides an input corresponding to their passcode being an ordered selection of 6 of the cells of the grid. This passcode is sent to an authentication engine as a string of cell ID's representing each chosen cell in the specified order.

Upon receipt of this information the authentication engine assigns a unique reference number ((PI) to the user's passcode. A grid salt will also be generated for the user by the authentication engine. The grid salt is an 8 character pseudo-random string of ASCII printable characters that is unique to the user.

The PI is then split into five codes using a secret sharing algorithm. Each of the five codes is a 40 character string representing a decimal number. The secret sharing algorithm is such that it is only necessary to have three of the codes to regenerate the original PI using the secret sharing algorithm. Two of the five codes are randomly selected and discarded. The three remaining codes are arbitrarily assigned to be an X-SID, Y-SID, and Z-SID.

A client ID (CID) is provided for each client from the access token purchased by or granted to that client. An individual client may allow many users to access the system as determined by the licence they have purchased.

For each user, the system creates a base grid. The base grid is a grid of cells that is encrypted using the CID, the grid size and the grid salt for that user. The base grid is a re-creatable pseudo-randomised grid that is unique to the user. In the present embodiment the grid size is that which has been selected by the user.

An X-OTC (abscissa one-time code) and a Y-OTC (ordinate one time code) are read from the generated base grid using the user's passcode. The X-OTC being the one time code on an X-base of the base grid consisting of the values found at the positions of the user's passcode.

The Y-OTC being the one time code of a Y-base of the base grid consisting of the values found at the positions of the user's passcode. The X-OTC and Y-OTC are used as indices to store the X-SID and Y-SID in an array in a database. In particular, the X-SID and Y-SID are stored in an array at the locations X-OTC and Y-OTC, and the position in each array are returned as x-delta and y-delta.

A user token comprising the following data is then generated:
version—the version of the system used to generate the user token
creation date—a unix timestamp when the user token was generated
expiry date—a unix timestamp when the user token will expire
grid salt
grid size
PI
PIN
x-delta
y-delta
Z-SID The user token is then base64 encoded and encrypted using asymmetric encryption and private key known only to the authentication engine. Finally, the user token is passed back to the user to be stored with the user data, for example on a client system.

Authenticating a User

When a user wishes to log in, they access the system online. The system then generates a challenge code, which is a unique encrypted string created by the authentication engine. The user may then select a grid of the appropriate size, as they have previously selected. The system then generates a grid which it presents to the user. The grid has a pseudo-random number at each location generated from the challenge code.

The system will then request that the user thinks of the nth number of their PIN, where n is randomly selected by the system. The user will then enter their credentials which will either be their username or email address, followed by entering their one-time code read from the grid presented to them. This is done by swiping left or right to align their nth digit in their PIN in each of the six cells of their passcode in turn. When the digit in one cell is correct the user taps the grid and then moves to the next cell in their passcode. When this is complete a login request is made. The number of swipes for each tap are counted and sent as a string of numbers, instead of the actual one-time code.

This information is then sent to the authentication engine accompanied by the user token for the specific user. The user token is then decrypted by the authentication engine to obtain the:
PI;
PIN
x-delta;
y-delta;
Z-SID;
grid salt; and
grid size.

The challenge code is then used by the authentication engine to regenerate the grid presented to the user. The PIN is then obtained from the user token and used to convert the swipes into the actual one-time code. From the regenerated grid and the one-time code entered all possible passcodes can be tested in sequence using the following mechanism.

The base grid is generated from the client ID and grid salt. The X-OTC and the Y-OTC are then obtained for a possible passcode. An X-SID and Y-SID are fetched from the array in the database using the X-OTC/x-delta and Y-OTC/y-delta as keys. The X-SID and Y-SID are them combined with the Z-SID from the user token using the secret sharing algorithm to calculate a PI. If the calculated PI matches the PI in the user token then the passcode is correct. If a correct passcode is found then the user is authenticated.

The invention claimed is:

1. A method of registering a new user of an online system comprising the steps of:
    creating a base grid for the user, the base grid comprising a re-creatable pseudo-randomized grid that is unique to the user;
    receiving and confirming an input from a user comprising a passcode, wherein the passcode comprises an indication of an ordered set of cells in a generated grid, said generated grid comprising a plurality of cells each containing a character;
    generating a passcode identifier from the passcode;
    generating a grid salt for the user;
    generating user identifying information for the user;
    splitting the passcode identifier into k parts using a secret sharing algorithm wherein:
        q of the k parts are required to regenerate the passcode identifier and k≥q;
        3=q;
        a first part is assigned to be an X-SID and is stored in a first location in an array;
        a second part is assigned to be a Y-SID and is stored in a second location in the array;
        a third part is assigned to be a Z-SID and is stored in a third location; and
        p of the k parts are discarded and p≥0; and wherein
        a X-OTC and a Y-OTC are read from the base grid using the user's passcode;
        the X-OTC is used as an index for the first part in the array and the position of the first part in the array is returned as x-delta;
        the Y-OTC is used as an index for the second part in the array; and
        the position of the second part in the array is returned as y-delta;
        the third part is stored with the user identifying information;
    a user token comprising a version, a creation date, an expiry date, the grid salt, x-delta, y-delta, and Z-SID is generated; and
    the user token is encrypted and passed back to the user for storage.

2. A method according to claim 1, wherein p≥1.

3. A method according to claim 1, wherein the shape of the generated grid and the number of cells of the generated grid are selected by the user.

4. A method according to claim 3, wherein the generated grid comprises at least 6×6 cells.

5. A method of authenticating a user of an online system that has registered using the method of claim 1, the method comprising the steps of:
    generating a challenge code for the user;
    generating a generated grid for the user having a pseudo-random character at each cell generated from the challenge code;
    receiving an input from the user comprising an indication of their passcode, being an ordered set of cells in the generated grid, a credential, and their user token;
    decrypting the user token and generating the user's base grid from the decrypted user token;
    obtaining x-delta, y-delta, Z-SID and the grid salt for the user from the decrypted user token;
    regenerating the generated grid presented to the user from the grid salt; and
    identifying all the possible passcodes in the generated grid from the indication of the passcode received from the user;
    i) retrieving an X-SID and a Y-SID of a passcode identifier from the array for the one of the possible passcodes using the x-delta and y-delta;
    ii) regenerating a passcode identifier associated with the user from the X-SID, Y-SID, and Z-SID using the secret sharing algorithm; and
    iii) authenticating the user if the regenerated passcode identifier matches the passcode identifier generated from the input;
    iv) repeating steps (i) to (iii) for a subsequent one of the possible passcodes if the regenerated passcode identifier does not match the passcode identifier generated from the input;
    v) denying authentication of the user if the regenerated passcode identifier does not match the passcode identifier generated from the input for any of the possible passcodes.

6. A method according to claim 5, wherein the input from the user comprises the string of characters located in the ordered set of cells.

7. A method according to claim 5, wherein the input from the user comprises a plurality of user gestures indicating the ordered set of cells.

* * * * *